(12) United States Patent
Mueck et al.

(10) Patent No.: US 10,812,161 B2
(45) Date of Patent: Oct. 20, 2020

(54) TECHNIQUES FOR CONTROL OF BEAM SWITCHING

(71) Applicant: Intel IP Corporation, Santa Clara, CA (US)

(72) Inventors: Markus Dominik Mueck, Unterhaching (DE); Honglei Miao, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/411,335

(22) Filed: May 14, 2019

(65) Prior Publication Data

US 2020/0014444 A1    Jan. 9, 2020

(30) Foreign Application Priority Data

Jul. 4, 2018  (EP) .................................... 18181672

(51) Int. Cl.
| H04B 7/06 | (2006.01) |
| H04B 7/0408 | (2017.01) |
| H04B 7/08 | (2006.01) |

(52) U.S. Cl.
CPC ......... *H04B 7/0623* (2013.01); *H04B 7/0408* (2013.01); *H04B 7/0602* (2013.01); *H04B 7/088* (2013.01)

(58) Field of Classification Search
CPC combination set(s) only.
See application file for complete search history.

(56) References Cited

U.S. PATENT DOCUMENTS

| 6,907,269 B2 * | 6/2005 | Yamaguchi ............ H01Q 1/246 342/147 |
| 9,014,733 B2 * | 4/2015 | Yu ......................... H04B 7/0695 455/500 |
| 10,554,280 B2 * | 2/2020 | Cheng .................. H04B 7/0626 |

(Continued)

FOREIGN PATENT DOCUMENTS

WO    WO-2017221202 A1    12/2017

OTHER PUBLICATIONS

Ericsson, "Analysis of Beam Indication Signalling Options", 3GPP TSG RAN WG1 Meeting 90bis, 14 pgs., Oct. 8, 2017, retrieved from: URL:http://www.3gpp.org/ftp/Meetings_3GPP_SYNC/RAN1/Docs/.

(Continued)

Primary Examiner — Linda Wong
(74) Attorney, Agent, or Firm — Schiff Hardin LLP

(57) ABSTRACT

This disclosure relates to a beamforming controller for a beamforming transmitter device, the beamforming controller comprising a control element configured to: activate a first configuration state of a plurality of configuration states for a control channel, each configuration state indicating a beam direction of the control channel; control a beam switching of the control channel from the first configuration state to a second configuration state based on a beam direction of the control channel according to the first configuration state; and retransmit signaling of the beam switching based on a beam direction of the control channel according to both the first and the second configuration state if an acknowledgement to the beam switching is null, not received, missing or received in error.

21 Claims, 5 Drawing Sheets

(56) References Cited

U.S. PATENT DOCUMENTS

| | | | | |
|---|---|---|---|---|
| 2002/0168946 | A1* | 11/2002 | Aizawa | H04B 7/0617 455/82 |
| 2010/0189189 | A1* | 7/2010 | Hoshino | H04B 7/0617 375/267 |
| 2013/0121386 | A1* | 5/2013 | Hoshino | H04B 7/0617 375/219 |
| 2013/0172002 | A1* | 7/2013 | Yu | H04B 7/0617 455/452.1 |
| 2013/0343303 | A1* | 12/2013 | Kim | H04B 7/0639 370/329 |
| 2014/0341048 | A1* | 11/2014 | Sajadieh | H04L 5/0085 370/252 |
| 2016/0006122 | A1* | 1/2016 | Seol | H04L 1/0006 342/372 |
| 2017/0134964 | A1* | 5/2017 | Yu | H04L 5/005 |
| 2017/0155432 | A1* | 6/2017 | Kim | H04W 72/046 |
| 2018/0034531 | A1* | 2/2018 | Sadiq | H04W 72/046 |
| 2018/0048375 | A1* | 2/2018 | Guo | H04B 7/024 |
| 2018/0109986 | A1* | 4/2018 | Touboul | H04W 36/06 |
| 2018/0227031 | A1* | 8/2018 | Guo | H04L 5/0053 |
| 2019/0132828 | A1* | 5/2019 | Kundargi | H04W 24/10 |
| 2019/0182697 | A1* | 6/2019 | Zhang | H04B 7/0456 |
| 2019/0199412 | A1* | 6/2019 | Koskela | H04B 7/0417 |
| 2019/0200337 | A1* | 6/2019 | Zhou | H04W 72/046 |
| 2019/0280784 | A1* | 9/2019 | Kwak | H04N 7/088 |
| 2019/0327768 | A1* | 10/2019 | Kim | H04W 88/10 |
| 2019/0356378 | A1* | 11/2019 | Takeda | H04B 7/088 |
| 2020/0014453 | A1* | 1/2020 | Takeda | H04L 5/10 |
| 2020/0022067 | A1* | 1/2020 | Pan | H04W 48/10 |
| 2020/0077320 | A1* | 3/2020 | Shimoda | H04W 36/0016 |
| 2020/0112993 | A1* | 4/2020 | Tsai | H04W 72/005 |
| 2020/0119869 | A1* | 4/2020 | Taherzadeh Boroujeni | H04L 5/0094 |

OTHER PUBLICATIONS

European Patent Office, Search Report issued for EP 18181672.9, 9 pgs., dated Jan. 11, 2019.

* cited by examiner

US 10,812,161 B2

TECHNIQUES FOR CONTROL OF BEAM SWITCHING

FIELD

The disclosure relates to techniques for control of beam switching, in particular for control channel beam misalignment mitigation in 5G New Radio (NR). The disclosure particularly relates to a beamforming controller for a beamforming transmitter device, e.g. a 5G NR gNodeB, a receiver device, e.g. a user equipment (UE) and to methods for controlling beamforming of such beamforming transmitter devices and receiver devices.

BACKGROUND

In mobile communication such as 3GPP new radio system, control channel of base station (denoted as gNodeB or gNB in 5G NR) can be configured with a plurality of states, each of which associated with a DL reference signal resulting in a specific beam alignment. When a beam switching 103 from a first beam alignment 101 to a second beam alignment 102 is signaled by base station 110 to UE 120 as exemplarily illustrated in FIG. 1, acknowledgement (ACK) signal 104 from UE 120 to base station 110 may be lost or may be wrongly received. Such missing or erroneous reception of uplink ACK response 104 would cause beam misalignment 105 between base station, i.e., gNB 110 and UE 120. Such beam misalignment problem is illustrated in FIG. 1.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
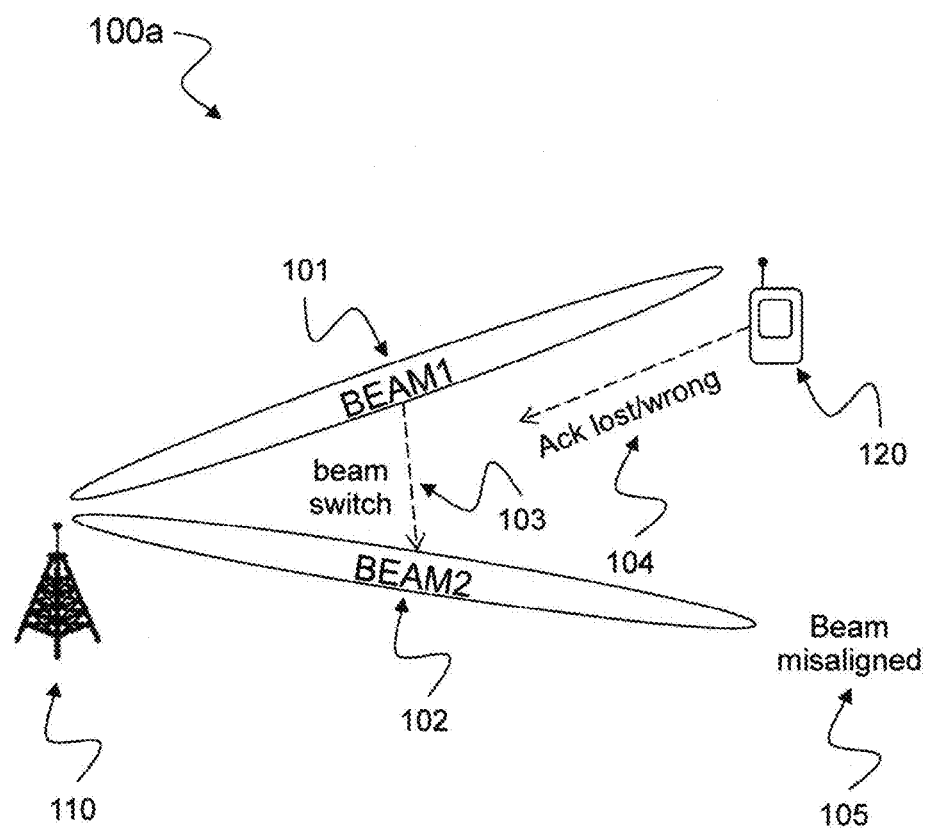
FIG. 1 is a schematic diagram illustrating an exemplary beam misalignment scenario 100a in beamforming radio communication.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
NR: New Radio
CORESET: Control Channel Resource Set
MAC: Medium Access Control
CE: Control Element
TCI: Transmission Configuration Indicator
ACK: Acknowledgement
NACK: Non-Acknowledgement
gNB: base station in 5G NR standards
UE: User Equipment
PDCCH: Physical Downlink Control Channel It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards. Any of the radio links described herein may operate according to any one or more of the following radio communication technologies and/or standards including but not limited to: a Global System for Mobile Communications (GSM) radio communication technology, a General Packet Radio Service (CPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.]. Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. I.e., some or all features defined for network equipment may be implemented by a UE.

In the following, various configurations or configuration states for a control channel, e.g. PDCCH, based on a plurality of transmission configuration indicator, TCI, states of a control channel resource set, CORESET are described. Such configurations may be 2-dimensional configurations of a beam direction in a plane (for 2D-beamforming) or 3-dimensional configurations of the beam direction in space (for 3D-beamforming). A receiver may detect such configuration by beam sweeping or by blind detection. A switch of configuration from e.g. 2D-configuration to 3D-configuration is possible and can be detected by techniques according to the disclosure. For example, such techniques may detect a 2D-2D misconfiguration, a 3D-3D misconfiguration of a 2D-3D misconfiguration.

The methods and devices described below may be implemented in electronic devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The disclosure presents a two-beam based retransmission scheduling method to resolve the ambiguity of beam misalignment. Specifically, in case of lost ACK or NACK received by gNB for the beam switching MAC-CE, gNB shall schedule the retransmission of MAC-CE by using both old and new beam until ACK is received for the beam switching command. By virtue of the presented techniques, ambiguity of beam misalignment during beam switching can be resolved.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

FIG. 1 is a schematic diagram illustrating a beam misalignment scenario 100a in beamforming radio communication. In 3GPP new radio system, control channel resource set (CORESET) can be configured with K>1 transmission configuration indicator (TCI) states, each of which is associated with a DL reference signal. Moreover, MAC control element (CE) can be used to activate one of K configured TCI states as the used TCI state for the CORESET. Since the activated TCI state of CORESET indicates the downlink beam direction 101, 102 of physical control channel, MAC-CE based TCI state signaling essentially realizes the beam switching 103 of control channel. However, when MAC-CE signals the beam switching 103 of CORESET, i.e. control channel thereof, erroneous reception of uplink ACK response 104 would cause beam misalignment 105 between gNB 110 and UE 120. Such beam misalignment problem is illustrated in FIG. 1.

Figure 2:
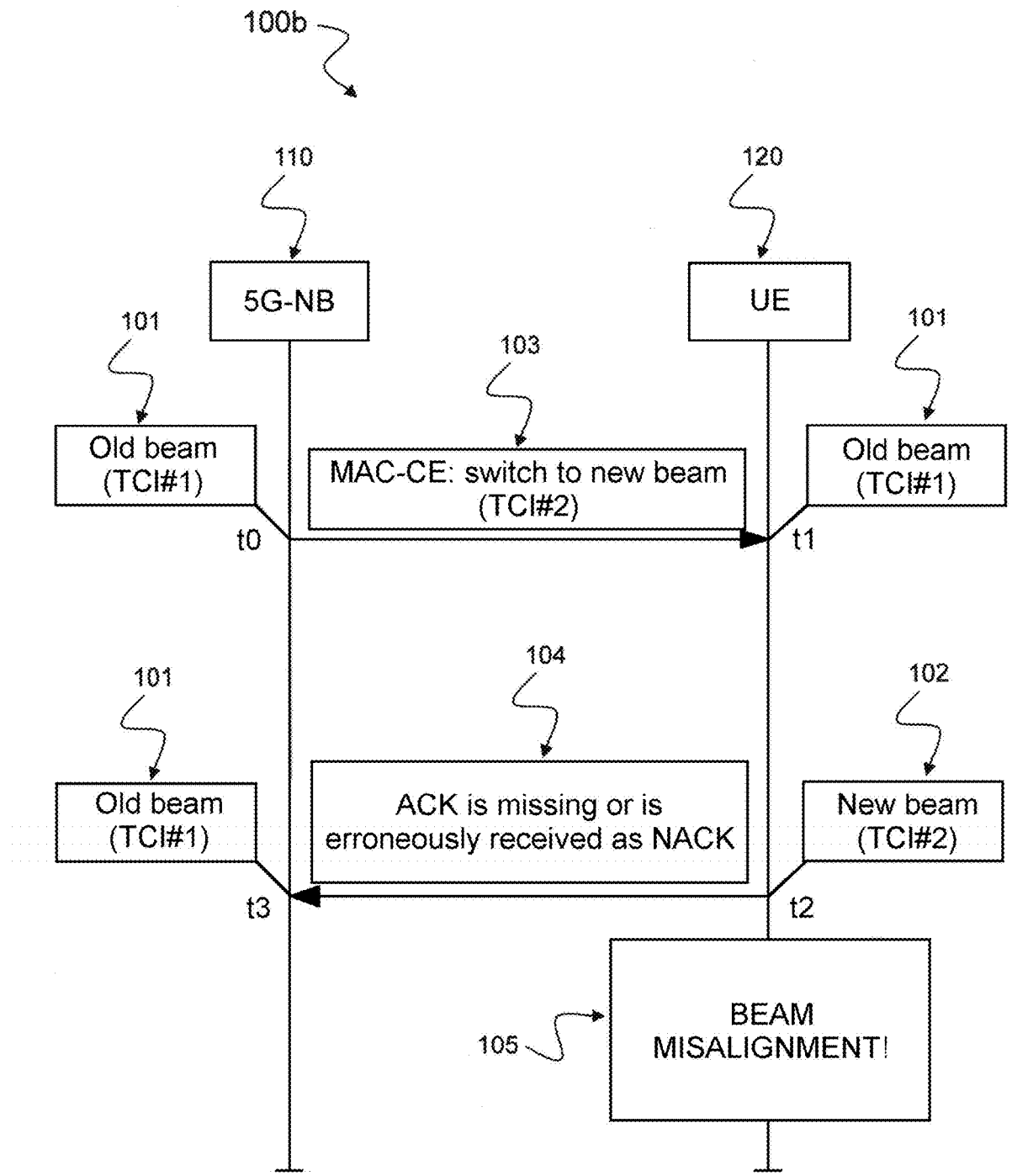
FIG. 2 is a message sequence diagram 100b illustrating the beam misalignment scenario 100a according to FIG. 1.

FIG. 2 is a message sequence diagram 100b illustrating the beam misalignment scenario 100a according to FIG. 1. As shown in FIG. 2, at time t0, MAC-CE (of 5G-NB, also denoted as gNB 110) signals the beam switching 103 of control channel from old beam TCI #1, 101 to new beam TCI #2, 102. At time t1, UE 120 correctly receives and decodes the MAC-CE of control channel beam switching 103. At time t2, UE 120 responds the ACK 104 to gNB 110, and starts to employ new beam TCI #2, 102 to receive future control channel. However, if at time t3, the ACK response 104 is lost or incorrectly received as NACK at gNB 110, gNB 110 would assume that UE 120 has not correctly received the previous MAC-CE about beam switching 103. As a result, gNB 110 would continue to use old beam TCI #1, 101, e.g., to retransmit MAC-CE 103 while UE 120 has already switched to the new beam TCI #2, 102. In this case, UE 120 would be never able to correctly receive control channel from gNB 110 due to the beam misalignment 105.

Figure 3:
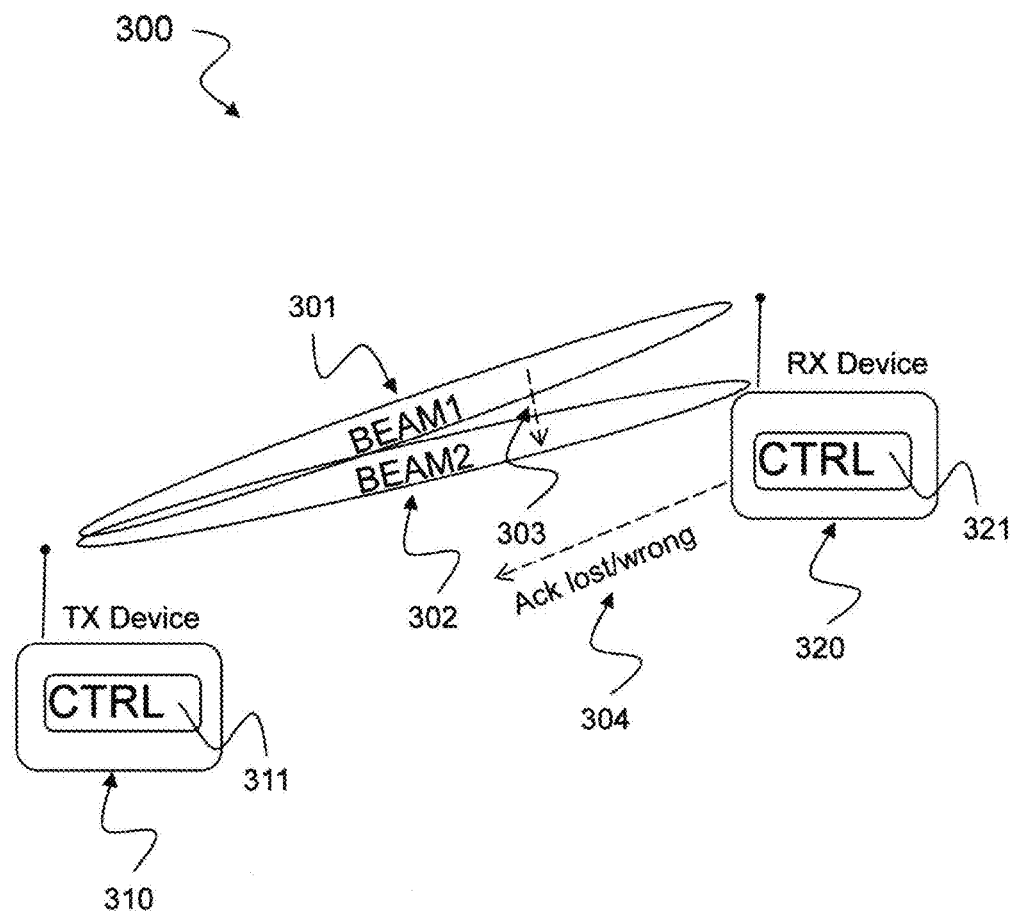
FIG. 3 is a schematic diagram illustrating a beamforming radio communication system 300 with beamforming TX device 310 and RX device 320 according to the disclosure.

FIG. 3 is a schematic diagram illustrating a beamforming radio communication system 300 with beamforming TX device 310 and RX device 320 according to the disclosure. Beamforming TX device 310 includes a beamforming controller with control element 311 for beamforming control, e.g. as described below with respect to FIG. 4. Similarly, the receive device 320 includes a control element 321 for beamforming control, e.g. as described below with respect to FIG. 4. Beamforming TX device 310 may correspond to gNB 110 described with respect to FIGS. 1 and 2 in which control element 311 implements new beamforming technique on transmitter side. RX device 320 may correspond to UE 120 as described with respect to FIGS. 1 and 2 in which control element 321 implements new beamforming technique on receiver side.

The beamforming TX device 310 includes a beamforming controller with control element 311 that is configured to: activate a first configuration state of a plurality of configuration states for a control channel, each configuration state indicating a beam direction 301, 302 of the control channel; control a beam switching 303 of the control channel to switch or signal a switching from the first configuration state to a second configuration state based on a beam direction 301 of the control channel according to the first configuration state; and retransmit signaling of the beam switching 303 based on a beam direction 301, 302 of the control channel according to both the first and the second configuration state if an acknowledgement 304 to the beam switching 303 is null, not received, missing or received in error. The control element 311 may include a beam switching element or a beam switching circuitry, e.g. a hardware circuit, for performing the beam switching 303. The beam switching element and/or the beam switching circuitry may for example be implemented in a radio frequency chipset of the beamforming TX device 310.

The control element 311 may be configured to activate the first configuration state for the control channel based on a plurality of transmission configuration indicator, TCI, states of a control channel resource set, CORESET, each of the TCI states associated with a respective downlink reference signal.

The control element 311 may be configured to activate a downlink beam direction of the control channel based on an activation of a TCI state of the plurality of TCI states.

The control element 311 may be configured to retransmit the signaling of the beam switching 303 based on a beam direction of the control channel according to the first configuration state before retransmitting the signaling of the beam switching 303 based on a beam direction 302 of the control channel according to the second configuration state.

The control element 311 may be configured to retransmit the signaling of the beam switching 303 based on a beam direction 301 of the control channel according to the first configuration state and based on a beam direction 302 of the control channel according to the second configuration state at the same time.

The control element 311 may be configured to retransmit the signaling of the beam switching 303 until an acknowledgement indicating the beam switching 303 is received.

The control element 311 may be configured to schedule a first series of retransmissions of the beam switching signaling based on a beam direction 301 of the control channel according to the first configuration state if the acknowledgement 304 is null, not received, missing or received in error.

The control element 311 may be configured to schedule a second series of retransmissions of the beam switching signaling based on a beam direction 302 of the control channel according to the second configuration state if no response is received for the first series of retransmissions.

The control element 311 may be configured to schedule a third series of retransmissions of the beam switching signaling based on alternating beam directions of the control channel according to the first and second configuration states if the acknowledgement 304 is missing or erroneously received. The control element 311 may be configured to schedule the third series of retransmissions of the beam switching signaling until an acknowledgement indicating the beam switching is received. Each odd-numbered retransmission of the beam switching signaling may be based on the first configuration and each even-numbered retransmission of the beam switching signaling may be based on the second configuration.

The control element 311 may be configured to retransmit the beam switching signaling based on a different code rate and/or modulation of the control channel. The signaling can use more robust physical modes, for example QPSK modulation may be more robust than QAM modulation and channel coding 0.5 may be more robust than channel coding 0.75.

The control element 311 may be configured to retransmit the beam switching signaling based on a wider beam than a beam width used for the original transmitted beam switching signaling. For example, in millimeter wave signaling (5G NR) or when frequency is above about 6 GHz, a narrow beam may have an angle of about 5 degree to 10 degree while a wider or broader beam may have an angle larger than 10 degrees. In 3GPP LTE, for example, or when frequency is below about 6 GHz, a narrow beam may have an angle of about 5 degree to 15 degree while a wider or broader beam may have an angle larger than 15 degrees. A wide beam may include a single beam of large angle or a plurality of narrow beams showing in different directions.

Each configuration state may indicate a 2-dimensional beam direction or a 3-dimensional beam direction of the control channel. Each configuration state may be from a first set of configuration states indicating 2-dimensional beam directions of the control channel or from a second set of configuration states indicating 3-dimensional beam directions of the control channel.

The control element 311 may be configured to: signal the beam switching of the control channel to a group of receiver devices; and retransmit signaling of the beam switching to the group of receiver devices if an acknowledgement of one receiver device of the group of receiver devices is missing or erroneously received, e.g. as described below with respect to FIG. 4.

The control element 311 may be configured to: signal the beam switching of the control channel to a group of receiver devices; and retransmit signaling of the beam switching to the group of receiver devices if an acknowledgement of a specific receiver device of the group of receiver devices is missing or erroneously received, e.g. as described below with respect to FIG. 4.

The receiver device 320 comprises a control element 321 that is configured to: receive, via a control channel, a signal indicating a beam switching 303 of the control channel from a first configuration state to a second configuration state, wherein the first and second configuration states are associated with different beam directions 301, 302 of the control channel, wherein the signal is received based on a beam direction 301 of the control channel according to the first configuration state; and signal, via the control channel, an acknowledgement 304, wherein the acknowledgement 304 is signaled based on a beam direction 302 of the control channel according to the second configuration state.

A configuration state for the control channel may be based on a plurality of transmission configuration indicator, TCI, states of a control channel resource set, CORESET, each of the TCI states associated with a respective downlink reference signal.

The control element 321 may be configured to detect a downlink beam direction of the control channel based on the TCI state of the plurality of TCI states.

The control element 321 may be configured to detect a beam direction of the control channel based on beam sweeping. Alternatively, the control element 321 may be configured to blindly detect the beam direction of the control channel.

Each configuration state may indicate a 2-dimensional beam direction or a 3-dimensional beam direction of the control channel. Each configuration state may be from a first set of configuration states indicating 2-dimensional beam directions of the control channel or from a second set of configuration states indicating 3-dimensional beam directions of the control channel. The control element 321 may be configured to signal the acknowledgement based on the first set of configuration states if the signal indicates a beam switching of the control channel to the first set of configuration states. The control element 321 may be configured to signal the acknowledgement based on the second set of configuration states if the signal indicates a beam switching 303 of the control channel to the second set of configuration states, e.g. as described below with respect to FIG. 4.

The beamforming receiver 320 may include a beamforming controller which includes the control element 321 which is configured to: receive a configuration change request, the configuration change request indicating a beam switching of a control channel from a first configuration state to a second configuration state; execute the configuration change request by activating the second configuration state for the control channel; and transmit an acknowledgement to the configuration change request. The beamforming receiver 320 may be a user equipment (UE). In an embodiment, the configuration change request may be issued by a base station, e.g. an eNB or a gNB. In an embodiment, the configuration change request may be conveyed by a base station, in particular an eNB or a gNB, from one user equipment to another user equipment.

Figure 4:
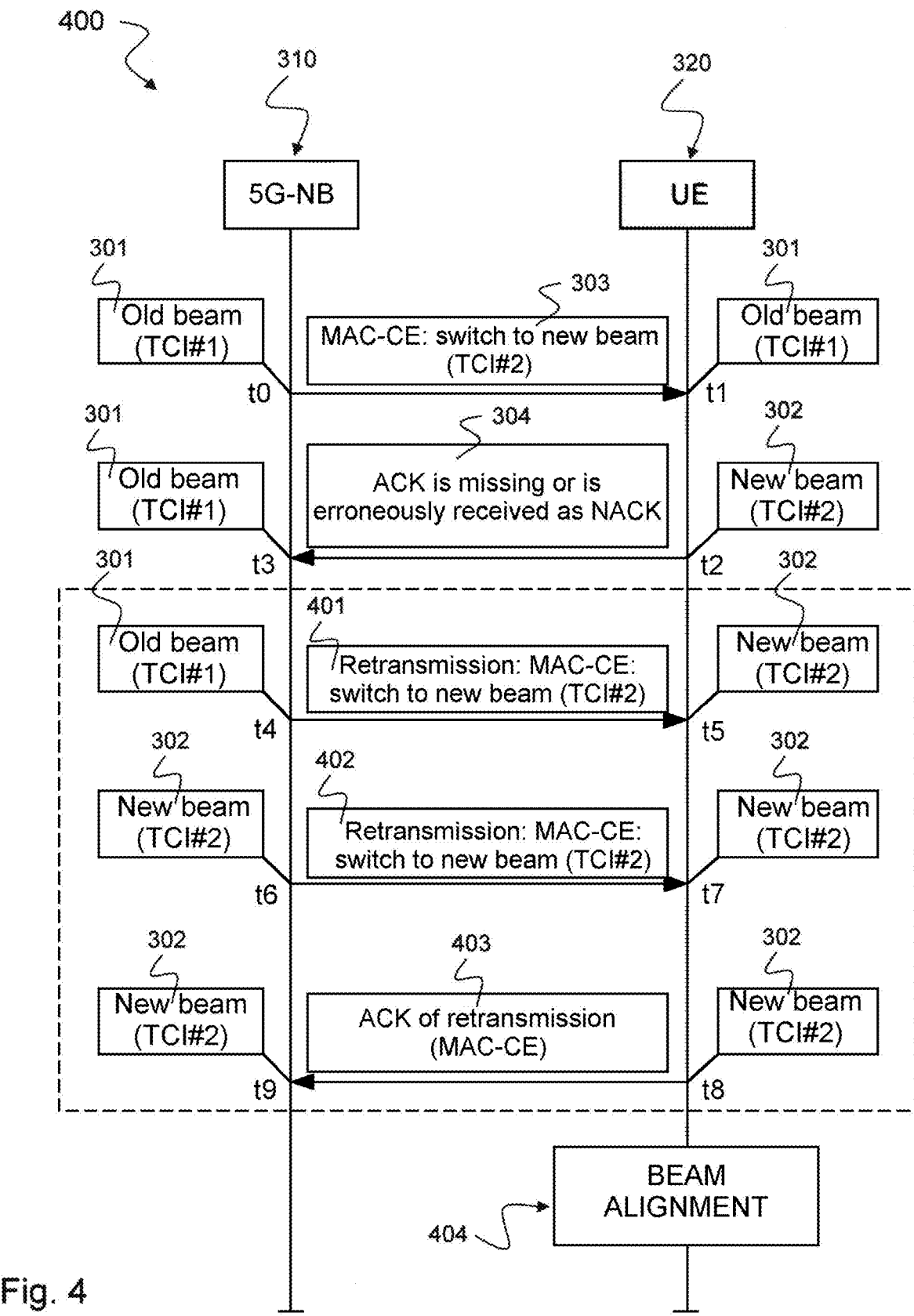
FIG. 4 is a message sequence diagram 400 illustrating a mitigation of beam misalignment according to the disclosure.

FIG. 4 is a message sequence diagram 400 illustrating a mitigation of beam misalignment according to the disclosure. FIG. 4 describes the beamforming radio communication system 300 as depicted in FIG. 3 in terms of control channel signaling messages. In particular, FIG. 4 illustrates the so-called "Two-beam based retransmission scheduling". This method can be used to mitigate the beam misalignment problem as illustrated in FIGS. 1 and 2. Specifically, in the presented method, gNB 310 schedules a series of retransmissions 401, 402 by using both old 301 and new 302 beams when it receives nothing or NACK response 304 on the beam switching MAC-CE. The main steps of the presented method are described in the dashed block in FIG. 4, and detailed as follows.

As described above with respect to FIG. 2, at time to, gNB 310 signals the beam switching 303 of control channel from old beam TCI #1, 301 to new beam TCI #2, 302. At time t1, UE 320 correctly receives and decodes the MAC-CE of control channel beam switching 303. At time t2, UE 320 responds with ACK 304 to gNB 310, and starts to employ new beam TCI #2, 302 to receive future control channel.

When at time t3, if gNB 310 receives nothing or NACK response from UE 320 for the reception of MAC-CE signaling beam switching 303, the following retransmission 401 of beam switching MAC-CE are transmitted by gNB 310 to resolve the beam misalignment.

At time t4, gNB sends the PDCCH using old beam TCI #1 to schedule a retransmission of beam switching MAC-CE. Since UE has already switched to receive new beam TCI #2, UE is not able to send ACK back to gNB.

Assuming that gNB 310 expects to receive ACK from UE 320 at a time earlier than t6, due to the absence of ACK response, at time t6, gNB 310 sends the PDCCH using new beam TCI #2, 302 to schedule a retransmission 402 of beam switching MAC-CE. Since UE 320 has already switched to receive new beam TCI #2, 302, at time t8 UE 320 shall send ACK 403 back to gNB 310.

In FIG. 4, retransmissions 401, 402 are at different times. In an exemplary implementation, these retransmissions 401, 402 may be sent simultaneously, i.e. at the same time since there is spatial separation for the two beams 301, 302. I.e. retransmission 401 may be sent by old beam 301 and retransmission 402 may be sent by new beam 302 simultaneously in time. In an exemplary implementation, a broad beam (or wide beam) may be used to send retransmissions 401, 402 by using a single beam.

At time t9, gNB 310 receives ACK 403 from UE 320 about beam switching 402 MAC-CE, and shall continue to employ new beam TCI #2, 302, to transmit the future PDCCHs. As a result, from the time t9 on, ambiguity of beam alignment has been resolved 404 at both gNB 310 and UE 320.

In case of poor data link or improper code rate being applied to PDSCH transmission carrying MAC-CE, a number of retransmissions may be required to resolve the beam misalignment. In this situation, the presented method can be generalized to the following alternatives.

Alternative 1: Beam-bundle based retransmission. In this option, gNB 310 schedules several retransmissions of beam switching MAC-CE by using old beam TCI #1, 301. If no response is received from UE 320 on these retransmitted MAC-CE, gNB 310 starts to send a number of retransmissions of beam switching MAC-CE by using new beam TCI #2, 302. By this method, gNB 310 can ensure that the first NACK is not false alarming.

In an alternative implementation, retransmissions of beam switching MAC-CE by using old beam TCI #1, 301 and respective retransmissions of beam switching MAC-CE by using new beam TCI #2, 302 may be sent simultaneously at the same time. There may be a number of retransmission pairs including old beam and new beam which are transmitted simultaneously in time.

Alternative 2: Beam-alternating based retransmission. In this option, gNB 310 schedules several retransmissions of beam switching MAC-CE by using old 301 and new 302 beam, i.e., TCI #1 and TCI #2, alternatively. Specifically, the odd numbered retransmission request may be transmitted by using old beam 301, TCI #1 while the even numbered retransmission request may be transmitted by using new beam 302, TCI #2. The retransmission requests stop after ACK response 403 is received at gNB 310. With this method, gNB 310 can resolve ambiguity of beam alignment more quickly when the first NACK is false alarming.

In an alternative implementation, the retransmissions of beam switching MAC-CE by using old 301 and new 302 beam may be transmitted simultaneously, e.g. by using a wide beam. There may be a number of retransmission pairs including old beam and new beam which are transmitted simultaneously in time.

Alternative 3: Widebeam based beam switching command transmission. In this option, to avoid the beam-misalignment induced dead-lock issue of control channel reception, gNB 310 can use wide-beam for the beam-switching command transmission. For instance, beam-switching command can be transmitted only from some specific control channel resources which only use wide-beam transmission. The control channel beam-switching can be applied to those control channel resources scheduling data traffic with dynamic beam switching. In this way, control channel beam-switching command can be received more robust, and no dead-lock issue shall appear.

The techniques described in this disclosure also apply to communication systems with multiple UEs, e.g. with some UEs having different TCI configurations or some UEs having the same TCI configuration. The techniques also apply to scenarios where gNB sends messages to multiple UEs, e.g. UE1 and UE2 as example. UE1 may have sent correct ACK while UE2 may have sent wrong or missing ACK. In such case, it can be detected that retransmission for UE2 may be required while no retransmission for UE1 may be required. The techniques described in this disclosure also apply to communication systems with groups of UEs, e.g. group 1 with UE1, UE3, UE4 and group 2 with UE2. It can be detected if ACK is incorrectly received for group 1 but correctly received for group 2, as example. In an exemplary implementation, it may be sufficient if a group leader sends the ACK and the configuration is valid for the whole group. In an alternative implementation, each UE of the group may be required to send a correct ACK.

For a generalization of the disclosed method all means possible to make the ACK/NACK signaling more robust should be exploited. For example, the allocation of resources from the (control) data transmission and the ACK/NACK can be altered while (control) data transmission may employ an adaptation of the redundancy (code rate, etc.) to the current propagation environment. ACK/NACK signaling should be by default transmitted based on the most robust modes. This can be achieved through a suitable parameterization of the current Rel. 15 standard.

Furthermore, in some scenarios, specific impairments may be considered—for example, if a physical antenna movement of the Base Station or the UE is possible, it may occur that beam alignment is becoming poor due to a small position change of any of the component. If such a scenario is present, an exemplary implementation is to always change to the largest beam configuration possible for ACK/NACK. Typically, a narrow beam may be employed for the exchange of the data in order to fully exploit the beamforming gain. Then, ACK/NACK can be transmitted using a wide beam configuration in order to maximize the reception chances even if a (limited) beam misalignment is present.

Figure 5:
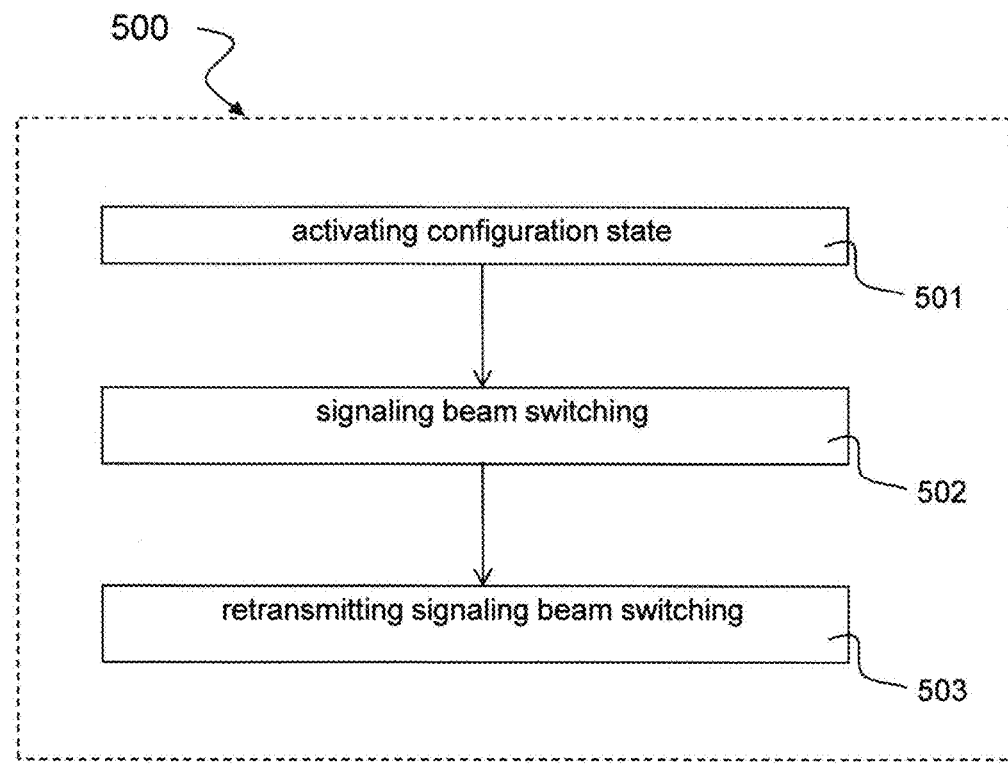
FIG. 5 is a schematic diagram illustrating a method 500 method for controlling beamforming of a beamforming transmitter device according to the disclosure.

FIG. 5 is a schematic diagram illustrating a method 500 method for controlling beamforming of a beamforming transmitter device, e.g. a TX device 310 as described above with respect to FIG. 4, according to the disclosure.

The method 500 comprises activating 501 a first configuration state of a plurality of configuration states for a control channel, each configuration state indicating a beam direction of the control channel, e.g. as described above with respect to FIGS. 3 and 4.

The method 500 comprises signaling 502 a beam switching of the control channel from a first configuration state to a second configuration state based on a beam direction 301 of the control channel according to the first configuration state, e.g. as described above with respect to FIGS. 3 and 4.

The method 500 further comprises retransmitting 503 signaling of the beam switching based on a beam direction 301, 302 of the control channel according to both the first and the second configuration state if an acknowledgement to the beam switching is missing or erroneously received 304, e.g. as described above with respect to FIGS. 3 and 4.

On receiver side, the following method for controlling beamforming signaling of a receiver device may be applied. The method comprises: receiving, via a control channel, a signal indicating a beam switching of the control channel from a first configuration state to a second configuration state, wherein the first and second configuration states are associated with different beam directions of the control channel, wherein the signal is received based on a beam direction of the control channel according to the first configuration state, e.g. as described above with respect to FIGS. 3 and 4; and signaling, via the control channel, an acknowledgement to the beam switching, wherein the acknowledgement is signaled based on a beam direction of the control channel according to the second configuration state, e.g. as described above with respect to FIGS. 3 and 4.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above with respect to FIGS. 4 and 5 and the computing blocks described above with respect to FIG. 3. Such a computer program product may include a non-transient readable storage medium storing program code thereon for use by a processor, the program code comprising instructions for performing the methods or the computing blocks as described above.

Examples

The following examples pertain to further embodiments. Example 1 is a beamforming controller for a beamforming transmitter device, the beamforming controller comprising a control element configured to: activate a first configuration state of a plurality of configuration states for a control channel, each configuration state indicating a beam direction of the control channel; control a beam switching of the control channel from the first configuration state to a second configuration state based on a beam direction of the control channel according to the first configuration state; and retransmit signaling of the beam switching based on a beam direction of the control channel according to both the first and the second configuration state if an acknowledgement to the beam switching is null, not received, missing or received in error.

In Example 2, the subject matter of Example 1 can optionally include that the control element is configured to activate the first configuration state for the control channel based on a plurality of transmission configuration indicator, TCI, states of a control channel resource set, CORESET, each of the TCI states associated with a respective downlink reference signal.

In Example 3, the subject matter of Example 2 can optionally include that the control element is configured to activate a downlink beam direction of the control channel based on an activation of a TCI state of the plurality of TCI states.

In Example 4, the subject matter of any one of Examples 1-2 can optionally include that the control element is configured to retransmit the signaling of the beam switching based on a beam direction of the control channel according to the first configuration state before retransmitting the signaling of the beam switching based on a beam direction of the control channel according to the second configuration state.

In Example 5, the subject matter of any one of Examples 1-2 can optionally include that the control element is configured to retransmit the signaling of the beam switching based on a beam direction of the control channel according to the first configuration state and based on a beam direction of the control channel according to the second configuration state at the same time.

In Example 6, the subject matter of any one of Examples 1-2 can optionally include that the control element is configured to retransmit the signaling of the beam switching until an acknowledgement indicating the beam switching is received.

In Example 7, the subject matter of any one of Examples 1-2 can optionally include that the control element is configured to schedule a first series of retransmissions of the beam switching signaling based on a beam direction of the control channel according to the first configuration state if the acknowledgement is null, not received, missing or received in error.

In Example 8, the subject matter of Example 7 can optionally include that the control element is configured to schedule a second series of retransmissions of the beam switching signaling based on a beam direction of the control channel according to the second configuration state if no response is received for the first series of retransmissions.

In Example 9, the subject matter of any one of Examples 1-2 can optionally include that the control element is configured to schedule a third series of retransmissions of the beam switching signaling based on alternating beam directions of the control channel according to the first and second configuration states if the acknowledgement is null, not received, missing or received in error.

In Example 10, the subject matter of Example 9 can optionally include that the control element is configured to schedule the third series of retransmissions of the beam switching signaling until an acknowledgement indicating the beam switching is received.

In Example 11, the subject matter of Example 9 can optionally include that each odd-numbered retransmission of the beam switching signaling is based on the first configuration and each even-numbered retransmission of the beam switching signaling is based on the second configuration.

In Example 12, the subject matter of any one of Examples 1-2 can optionally include that the control element is configured to retransmit the beam switching signaling based on a different code rate and/or modulation of the control channel.

In Example 13, the subject matter of any one of Examples 1-2 can optionally include that the control element is configured to retransmit the beam switching signaling based on a wider beam than a beam width used for the original transmitted beam switching signaling.

In Example 14, the subject matter of any one of Examples 1-2 can optionally include that each configuration state indicates a 2-dimensional beam direction or a 3-dimensional beam direction of the control channel.

In Example 15, the subject matter of Example 14 can optionally include that each configuration state is from a first set of configuration states indicating 2-dimensional beam directions of the control channel or from a second set of configuration states indicating 3-dimensional beam directions of the control channel.

In Example 16, the subject matter of any one of Examples 1-2 can optionally include that the control element is configured to: signal the beam switching of the control channel to a group of receiver devices; and retransmit signaling of the beam switching to the group of receiver devices if an acknowledgement of one receiver device of the group of receiver devices is null, not received, missing or received in error.

In Example 17, the subject matter of any one of Examples 1-2 can optionally include that the control element is configured to: signal the beam switching of the control channel to a group of receiver devices; and retransmit signaling of the beam switching to the group of receiver devices if an acknowledgement of a specific receiver device of the group of receiver devices is null, not received, missing or received in error.

Example 18 is a receiver device comprising a control element configured to: receive, via a control channel, a signal indicating a beam switching of the control channel from a first configuration state to a second configuration state, wherein the first and second configuration states are associated with different beam directions of the control channel, wherein the signal is received based on a beam direction of the control channel according to the first configuration state; and signal, via the control channel, an acknowledgement, wherein the acknowledgement is signaled based on a beam direction of the control channel according to the second configuration state.

In Example 19, the subject matter of Example 18 can optionally include that a configuration state for the control channel is based on a plurality of transmission configuration indicator, TCI, states of a control channel resource set, CORESET, each of the TCI states associated with a respective downlink reference signal.

In Example 20, the subject matter of Example 19 can optionally include that the control element is configured to detect a downlink beam direction of the control channel based on the TCI state of the plurality of TCI states.

In Example 21, the subject matter of any one of Examples 19-20 can optionally include that the control element is configured to detect a beam direction of the control channel based on beam sweeping.

In Example 22, the subject matter of any one of Examples 19-20 can optionally include that the control element is configured to blindly detect the beam direction of the control channel.

In Example 23, the subject matter of any one of Examples 19-20 can optionally include that each configuration state indicates a 2-dimensional beam direction or a 3-dimensional beam direction of the control channel.

In Example 24, the subject matter of Example 23 can optionally include that each configuration state is from a first set of configuration states indicating 2-dimensional beam directions of the control channel or from a second set of configuration states indicating 3-dimensional beam directions of the control channel.

In Example 25, the subject matter of Example 24 can optionally include that the control element is configured to signal the acknowledgement based on the first set of configuration states if the signal indicates a beam switching of the control channel to the first set of configuration states; and that the control element is configured to signal the acknowledgement based on the second set of configuration states if the signal indicates a beam switching of the control channel to the second set of configuration states.

Example 26 is a method for controlling beamforming of a beamforming transmitter device, the method comprising: activating a first configuration state of a plurality of configuration states for a control channel, each configuration state indicating a beam direction of the control channel; signaling a beam switching of the control channel from a first configuration state to a second configuration state based on a beam direction of the control channel according to the first configuration state; and retransmitting signaling of the beam switching based on a beam direction of the control channel according to both the first and the second configuration state if an acknowledgement to the beam switching is null, not received, missing or received in error.

In Example 27, the subject matter of Example 26 can optionally include: activating the first configuration state for the control channel based on a plurality of transmission configuration indicator, TCI, states of a control channel resource set, CORESET, each of the TCI states associated with a respective downlink reference signal.

In Example 28, the subject matter of Example 27 can optionally include: activating a downlink beam direction of the control channel based on an activation of a TCI state of the plurality of TCI states.

In Example 29, the subject matter of any one of Examples 26-27 can optionally include: retransmitting the signaling of the beam switching based on a beam direction of the control channel according to the first configuration state before retransmitting the signaling of the beam switching based on a beam direction of the control channel according to the second configuration state.

In Example 30, the subject matter of any one of Examples 26-27 can optionally include: retransmitting the signaling of the beam switching based on a beam direction of the control channel according to the first configuration state and based on a beam direction of the control channel according to the second configuration state at the same time.

In Example 31, the subject matter of any one of Examples 26-27 can optionally include: retransmitting the signaling of the beam switching until an acknowledgement to the beam switching is received.

Example 32 is a method for controlling beamforming signaling of a receiver device, the method comprising: receiving, via a control channel, a signal indicating a beam switching of the control channel from a first configuration state to a second configuration state, wherein the first and second configuration states are associated with different beam directions of the control channel, wherein the signal is received based on a beam direction of the control channel according to the first configuration state; and signaling, via the control channel, an acknowledgement to the beam switching, wherein the acknowledgement is signaled based on a beam direction of the control channel according to the second configuration state.

In Example 33, the subject matter of Example 32 can optionally include that a configuration state for the control channel is based on a plurality of transmission configuration indicator, TCI, states of a control channel resource set, CORESET, each of the TCI states associated with a respective downlink reference signal.

In Example 34, the subject matter of Example 33 can optionally include: detecting a downlink beam direction of the control channel based on the TCI state of the plurality of TCI states.

In Example 35, the subject matter of any one of Examples 32-33 can optionally include: detecting a beam direction of the control channel based on beam sweeping.

In Example 36, the subject matter of any one of Examples 32-33 can optionally include: blindly detecting the beam direction of the control channel.

Example 37 is a device for controlling beamforming of a beamforming transmitter device, the device comprising: means for activating a first configuration state of a plurality of configuration states for a control channel, each configuration state indicating a beam direction of the control channel; means for signaling a beam switching of the control channel from a first configuration state to a second configuration state based on a beam direction of the control channel according to the first configuration state; and means for retransmitting signaling of the beam switching based on a beam direction of the control channel according to both the first and the second configuration state if an acknowledgement to the beam switching is null, not received, missing or received in error.

In Example 38, the subject matter of Example 37 can optionally include: means for activating the configuration state for the control channel based on a plurality of transmission configuration indicator, TCI, states of a control channel resource set, CORESET, each of the TCI states associated with a respective downlink reference signal.

Example 39 is a beamforming system for a beamforming transmitter, the beamforming system comprising: an activation element configured to activate a first configuration state of a plurality of configuration states for a control channel, each configuration state indicating a beam direction of the control channel; a signaling element configured to control a beam switching of the control channel from a first configuration state to a second configuration state based on a beam direction of the control channel according to the first configuration state; and a retransmission element configured to retransmit signaling of the beam switching based on a beam direction of the control channel according to both the first and the second configuration state if an acknowledgement to the beam switching is null, not received, missing or received in error.

In Example 40, the subject matter of Example 39 can optionally include that the activation element is configured to activate the configuration state for the control channel based on a plurality of transmission configuration indicator, TCI, states of a control channel resource set, CORESET, each of the TCI states associated with a respective downlink reference signal.

Example 41 is a computer readable non-transitory medium on which computer instructions are stored which when executed by a computer cause the computer to perform the method of any one of Examples 26 to 36.

Example 42 is a beamforming controller for a beamforming receiver device, the beamforming controller comprising a control element configured to: receive a configuration change request, the configuration change request indicating a beam switching of a control channel from a first configuration state to a second configuration state; execute the configuration change request by activating the second configuration state for the control channel; and transmit an acknowledgement to the configuration change request.

In Example 43, the subject matter of Example 42 can optionally include that the beamforming controller is implemented in a user equipment.

In Example 44, the subject matter of any one of Examples 42-43 can optionally include that the configuration change request is issued by a base station, in particular an eNB or a gNB.

In Example 45, the subject matter of any one of Examples 42-43 can optionally include that the configuration change request is conveyed by a base station, in particular an eNB or a gNB, from one user equipment to another user equipment.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A beamforming controller for a beamforming transmitter, the beamforming controller comprising a Medium Access Control (MAC) controller configured to:
   activate a first configuration state of a plurality of configuration states for a control channel, each configuration state indicating a beam direction of the control channel, wherein the MAC controller is configured to activate the first configuration state for the control channel based on a plurality of transmission configuration indicator, TCI, states of a control channel resource set, CORESET, each of the TCI states associated with a respective downlink reference signal;

control a beam switching of the control channel from the first configuration state to a second configuration state based on a beam direction of the control channel according to the first configuration state; and retransmit signaling of the beam switching based on a beam direction of the control channel according to both, the first and the second configuration state if an acknowledgement to the beam switching is null, not received, missing or received in error.

2. The beamforming controller of claim 1, wherein the MAC controller is configured to activate a downlink beam direction of the control channel based on an activation of a TCI state of the plurality of TCI states.

3. The beamforming controller of claim 1, wherein the MAC controller is configured to retransmit the signaling of the beam switching based on a beam direction of the control channel according to the first configuration state before retransmitting the signaling of the beam switching based on a beam direction of the control channel according to the second configuration state.

4. The beamforming controller of claim 1, wherein the MAC controller is configured to retransmit the signaling of the beam switching based on a beam direction of the control channel according to the first configuration state and based on a beam direction of the control channel according to the second configuration state at the same time.

5. The beamforming controller of claim 1, wherein the MAC controller is configured to retransmit the signaling of the beam switching until an acknowledgement indicating the beam switching is received.

6. A beamforming controller for a beamforming transmitter device, the beamforming controller comprising a Medium Access Control (MAC) controller configured to:

activate a first configuration state of a plurality of configuration states for a control channel, each configuration state indicating a beam direction of the control channel, wherein the MAC controller is configured to schedule a first series of retransmissions of the beam switching signaling based on a beam direction of the control channel according to the first configuration state if the acknowledgement of the receiver is null, not received, missing or received in error;

control a beam switching of the control channel from the first configuration state to a second configuration state based on a beam direction of the control channel according to the first configuration state, wherein the MAC controller is configured to schedule a second series of retransmissions of the beam switching signaling based on a beam direction of the control channel according to the second configuration state if no response is received for the first series of retransmissions; and retransmit signaling of the beam switching based on a beam direction of the control channel according to both, the first and the second configuration state if an acknowledgement to the beam switching is null, not received, missing or received in error.

7. A beamforming controller for a beamforming transmitter device, the beamforming controller comprising a Medium Access Control (MAC) controller configured to:

activate a first configuration state of a plurality of configuration states for a control channel, each configuration state indicating a beam direction of the control channel;

control a beam switching of the control channel from the first configuration state to a second configuration state based on a beam direction of the control channel according to the first configuration state; and retransmit signaling of the beam switching based on a beam direction of the control channel according to both, the first and the second configuration state if an acknowledgement to the beam switching is null, not received, missing or received in error, wherein the MAC controller is configured to schedule a third series of retransmissions of the beam switching signaling based on alternating beam directions of the control channel according to the first and second configuration states if the acknowledgement is null, not received, missing or received in error.

8. The beamforming controller of claim 7, wherein the MAC controller is configured to schedule the third series of retransmissions of the beam switching signaling until an acknowledgement indicating the beam switching is received.

9. The beamforming controller of claim 7, wherein each odd-numbered retransmission of the beam switching signaling is based on the first configuration and each even-numbered retransmission of the beam switching signaling is based on the second configuration.

10. The beamforming controller of claim 1, wherein the MAC controller is configured to retransmit the beam switching signaling based on a different code rate and/or modulation of the control channel.

11. The beamforming controller of claim 1, wherein the MAC controller is configured to retransmit the beam switching signaling based on a wider beam than a beam width used for the original transmitted beam switching signaling.

12. The beamforming controller of claim 1, wherein each configuration state indicates a 2-dimensional beam direction or a 3-dimensional beam direction of the control channel.

13. The beamforming controller of claim 12, wherein each configuration state is from a first set of configuration states indicating 2-dimensional beam directions of the control channel or from a second set of configuration states indicating 3-dimensional beam directions of the control channel.

14. The beamforming controller of claim 1, wherein the MAC controller is configured to:

signal the beam switching of the control channel to a group of receivers; and retransmit signaling of the beam switching to the group of receivers if an acknowledgement of one receiver of the group of receivers is null, not received, missing or received in error.

15. The beamforming controller of claim 1, wherein the MAC controller is configured to:

signal the beam switching of the control channel to a group of receivers; and retransmit signaling of the beam switching to the group of receivers if an acknowledgement of a specific receiver of the group of receivers is null, not received, missing or received in error.

16. A method for controlling beamforming signaling of a receiver, the method comprising:

receiving, via a control channel, a signal indicating a beam switching of the control channel from a first configuration state to a second configuration state, wherein the first and second configuration states are associated with different beam directions of the control channel, wherein the signal is received based on a beam direction of the control channel according to the first configuration state; and signaling, via the control channel, an acknowledgement to the beam switching, wherein the acknowledgement is signaled based on a beam direction of the control channel according to the second configuration state, wherein a configuration state for the control channel is based on a plurality of transmission configuration indicator, TCI, states of a control channel resource set, CORESET, each of the TCI states associated with a respective downlink reference signal.

17. The method of claim 16, comprising:

detecting a downlink beam direction of the control channel based on the TCI state of the plurality of TCI states.

18. A beamforming controller for a beamforming receiver, the beamforming controller comprising a Medium Access Control (MAC) controller configured to:

receive a configuration change request, the configuration change request indicating a beam switching of a control channel from a first configuration state to a second configuration state;

execute the configuration change request by activating the second configuration state for the control channel; and transmitting an acknowledgement to the configuration change request, wherein a configuration state for the control channel is based on a plurality of transmission configuration indicator, TCI, states of a control channel resource set, CORESET, each of the TCI states associated with a respective downlink reference signal.

19. The beamforming controller of claim 18, implemented in a user equipment.

20. The beamforming controller of claim 18, wherein the configuration change request is issued by a base station, in particular an eNB or a gNB.

21. The beamforming controller of claim 18, wherein the configuration change request is conveyed by a base station, in particular an eNB or a gNB, from one user equipment to another user equipment.

* * * * *